Feb. 7, 1928.
H. W. C. LIDDIARD
1,658,644
CONTROL OF DYNAMO ELECTRIC MACHINES
Filed Sept. 28, 1926
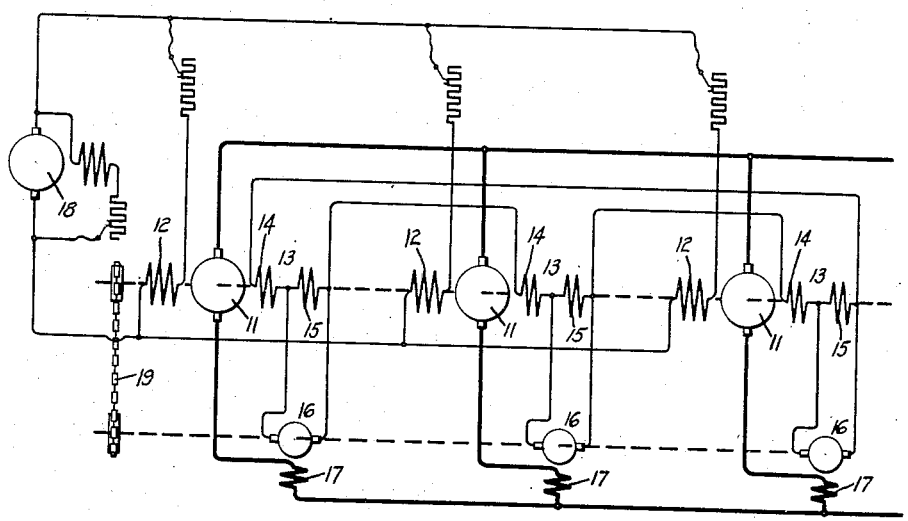
Inventor:
Hugh W.C. Liddiard,
by
His Attorney.

Patented Feb. 7, 1928.

1,658,644

UNITED STATES PATENT OFFICE.

HUGH W. C. LIDDIARD, OF RUGBY, ENGLAND, ASSIGNOR TO GENERAL ELECTRIC COMPANY, A CORPORATION OF NEW YORK.

CONTROL OF DYNAMO-ELECTRIC MACHINES.

Application filed September 28, 1926, Serial No. 138,310, and in Great Britain October 28, 1925.

This invention relates to the control of dynamo-electric machines connected in parallel and adapted to run at related speeds, as by being mechanically coupled together, and particularly to such machines which are adapted for heavy work, as, for example, for generating current for electrolytic work, where the current generated may be several thousand amperes. In such arrangements out-of-balance currents circulate between the machines, these currents being due to the fact that no two machines have exactly the same load characteristics, and, although balance can be obtained at any particular load, yet, on the load changing, the balance is no longer maintained.

In accordance with my invention, these out-of-balance currents are reduced by the provision of a pair of opposing auxiliary field windings for each machine, one auxiliary field winding being excited responsively to the machine current and the other to the mean current output of the group of machines.

For a better understanding of my invention, reference may be had to the following description taken in connection with the accompanying drawing, in which the single figure is a diagrammatic illustration of one embodiment of my invention.

In the drawing three dynamo-electric machines 11, which may be either generators or motors are shown as mounted on a single shaft. Each machine is provided with, in addition to its main field winding 12, auxiliary field windings 13 divided into two sections 14 and 15, which are so connected that when excited they will exactly neutralize each other under normal conditions, that is, when all these machines are delivering the same output. These field windings 13 are preferably excited by small auxiliary generators 16 which are separately excited by the main current from each main machine, as by windings 17. The main field windings are shown as being excited by exciter 18. The portions 14 of the auxiliary field windings 13 are all connected in series with the auxiliary generators 16. The portions 15 of the auxiliary fields 13 are each connected directly across the corresponding auxiliary generator 16. The portions 14 of the auxiliary fields 13 will be excited to an extent depending on one third of the sum of the currents from the three auxiliary generators 16, that is, to the mean output of the three auxiliary generators 16, whilst the excitation of the portions 15 of each auxiliary field 13 will be directly dependent on the current in the corresponding auxiliary generator 16. Provided the currents are balanced in the three generators 11, and, therefore, in the auxiliary generators 16, the excitation of the portions 14 and 15 of each auxiliary field 13 will be equal, and have no resultant effect. Should, however, there be any departure from the balanced distribution of current, the excitation of portions 14 and 15 will no longer be equal.

Portions 15 are arranged to oppose the main field 12 so that should the current in any particular generator 11 be greater than the mean, then the resultant effect of the auxiliary field 13 will be to oppose the main field. This will reduce the induced voltage in the corresponding generator and hence tend to reduce the current in that generator and restore the balance of currents. If one generator is taking more than its share of the load, then either one or both of the other generators are taking less than their corresponding share. A generator that is taking more will have its auxiliary field acting to reduce its current, whilst one that is taking less will have its auxiliary field operating to increase its current.

It will be obvious that the magnitude of the compensating effect depends on the relative value of the auxiliary field excitation compared with the main excitation, and that the actual effect of the compensating arrangement is to reduce the out-of-balance current by an amount depending on the effectiveness of the auxiliary field.

The auxiliary generators 16 should, preferably, be designed so that their voltage outputs are directly dependent upon the current outputs of their respective generators 11, and for this purpose we prefer to provide them with field systems similar to those of the old type of dynamo-electric machine with a straight-through single-bar excitation 17, similar to a single-turn current transformer. These generators 16 may be arranged on the base-plates of the main machines 11, and driven by means of a chain 19 from the main shaft, one of the main leads of each generator 11 being threaded through the field system of the corresponding exciter 16 to give the necessary excitation therefor.

Although the arrangement herein illustrated refers to the application of the invention to three generators connected in parallel and driven from a single shaft, it should be understood that the invention is not limited to this use.

What I claim as new and desire to secure by Letters Patent of the United States, is:—

1. In combination, a group of direct current dynamo-electric machines connected to operate in parallel, each of said machines having a main field winding and a pair of opposing auxiliary field windings, means for exciting one of said auxiliary field windings on each machine approximately in accordance with the current output of said machine and the other of said auxiliary field windings in accordance with the mean current output of said group of machines.

2. In combination, a group of direct current dynamo-electric machines connected to operate in parallel, each of said machines having a main field winding and a pair of opposing auxiliary field windings and an auxiliary generator for each of said machines, each of said auxiliary generators having a field winding excited in accordance with the current output of the corresponding dynamo-electric machine, one of said auxiliary field windings on each machine being connected to the auxiliary generator for said machine so as to be excited approximately in accordance with the current output of said machine, and the other of said auxiliary field windings being connected to said auxiliary generator so as to be excited in accordance with the mean current output of said group of machines.

3. In combination, a group of direct current dynamo-electric machines connected to operate in parallel, each of said machines having a main field winding and a pair of opposing auxiliary field windings, and an auxiliary generator for each of said machines, each of said auxiliary generators having a field winding excited in accordance with the current output of the corresponding dynamo-electric machine, one of said auxiliary field windings on each machine being connected so as to be excited directly from the corresponding auxiliary generator and to oppose the main field winding of said dynamo-electric machine, the other of said auxiliary field windings being connected to said auxiliary generators so as to be excited according to the mean current output of said auxiliary generators and to assist the main field winding of the corresponding dynamo-electric machine.

In witness whereof, I have hereto set my hand this sixth day of September, 1926.

HUGH W. C. LIDDIARD.